Patented July 9, 1929.

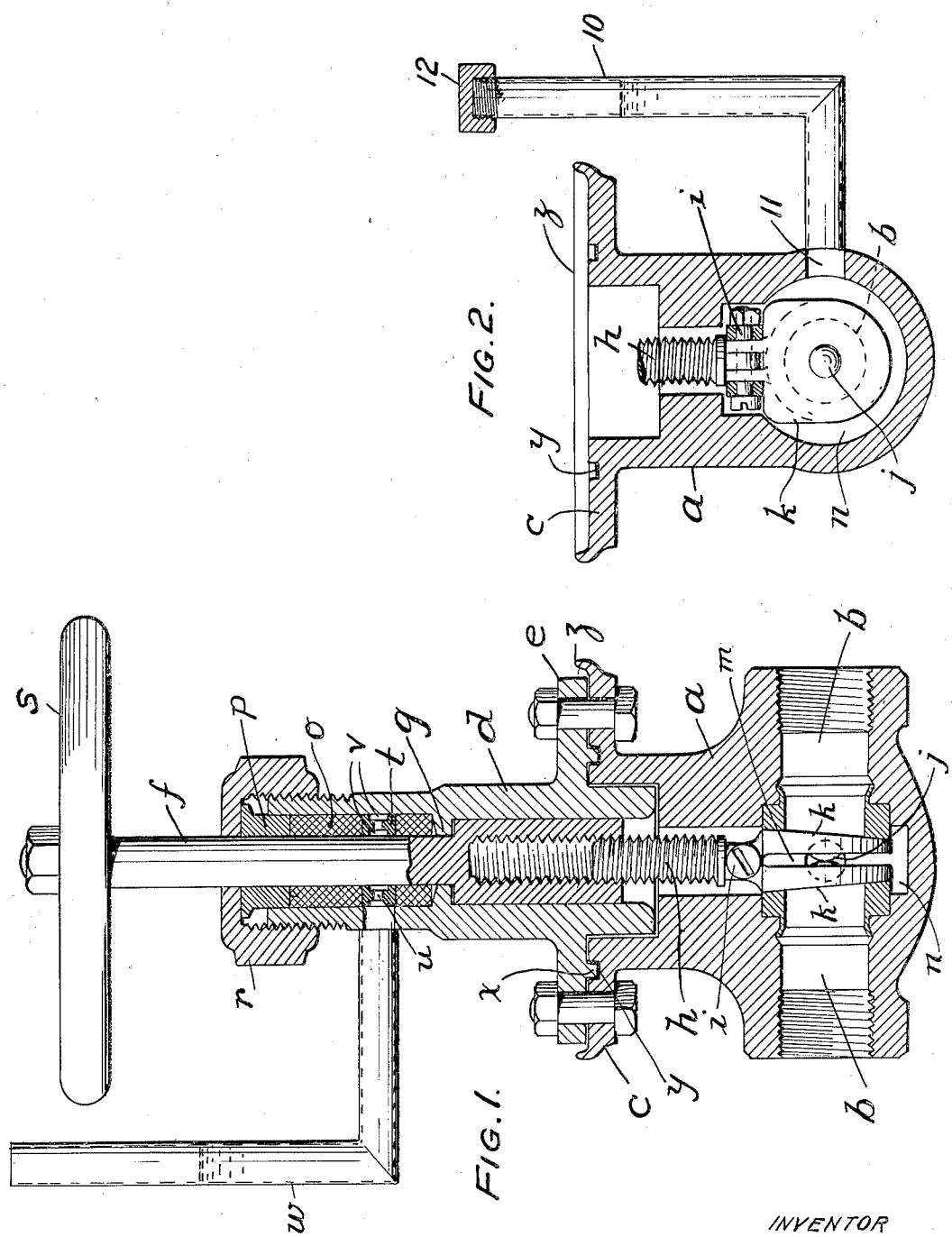

1,720,346

UNITED STATES PATENT OFFICE.

ARTHUR E. PEW, JR., OF BRYN MAWR, PENNSYLVANIA, ASSIGNOR TO SUN OIL COMPANY, OF PHILADELPHIA PENNSYLVANIA, A CORPORATION OF NEW JERSEY.

AIR-TIGHT VALVE STRUCTURE.

Application filed June 19, 1925. Serial No. 38,185.

The object of the invention is to provide a valve adapted to seal a vacuum chamber and through which there can be no leakage of air. Air may leak through the valve proper from the atmosphere, or from a pipe or chamber, with which, through the valve, the vacuum chamber is adapted, when the valve is open, to communicate; or if, as is usually the case, the valve is provided with a stem which is operable from outside the chamber, air may leak into the vacuum chamber through the valve stem. In all such valves, the valve seat is very carefully machined and fitted to eliminate, to as great an extent as possible, any small misfits or unevenness which might allow leakage, but as it is impossible to make a perfect fit, these expedients fail to produce an air-tight valve. Where an extremely high or nearly perfect vacuum must be maintained, or where it is undesirable to maintain in the vacuum chamber the current of rarefied air which results from maintaining a vacuum pump on the chamber so as to withdraw air as fast as it leaks into the chamber, a valve through which there is only a slight leakage cannot meet the requirements. As an example of an art in which a practically absolutely air-tight valve is required to enable a successful use of a process or apparatus, may be mentioned the distillation of mineral oil by the high vacuum process. Such a process and apparatus are set forth in an application filed of even date herewith, Serial No. 38,184. In the distilling plant of this application, there are provided a considerable number of valves which must be air-tight in order to successfully effect the distillation without cracking or decomposition; and the valve forming the subject-matter of this invention is especially adapted for use in this particular plant: although, of course, the valve is equally adapted for use in any other type of vacuum oil distilling plant, or in other and quite different arts.

A preferred embodiment of the invention is shown in the drawings, in which—

Fig. 1 is a vertical sectional view of a valve embodying the invention.

Fig. 2 is a vertical section through the lower part of the valve structure, taken at right angles to the section of Fig. 1.

The valve casing $a$ is provided with a passage $b$ that may be assumed, in one of different possible uses of the invention, to connect two tanks, one of which is to be maintained under a constant high vacuum, while the other of which is to be alternately under vacuum and atmospheric or other pressure.

The valve casing is centrally recessed and provided with an annular flange $c$. Within this recess extends the lower part of a valve bonnet $d$, which is provided with an annular flange $e$ overlying and bolted to the flange $c$.

Within the bonnet $d$ is the valve stem $f$, the lower part of which is enlarged and extends under an internal annular shoulder $g$ on the valve bonnet and is hollow and internally screw-threaded to receive an externally screw-threaded extension $h$ of the valve stem. Extension $h$ carries at its lower end a transversely extending pin or bolt $i$, which carries the valve proper. The valve is made in two parts or halves $k, k$, which are suspended from pin $i$. These two discs $k, k$, are wedge-shaped and extend into a wedge-shaped seat in the valve casing, and when seated thereon close the passage through the passage $b$ in the valve casing. The two discs $k, k$, are provided, on their opposing faces, with teats $j, j$, each having the contour of a section of a sphere and which abut against one another and leave between them a space $m$ which communicates with a space $n$ in the casing. These teats, being rounded as specified, make it possible for the valve to be self-adjusting and prevent the setting of the discs being affected by small particles of dirt or by wear on the wedge-shaped valve seat.

Within the upper part of the bonnet $d$ and surrounding the upper part of the valve stem $f$ is packing $o$, held down against the shoulder $g$ by means of a gland $p$, which is held down against the packing by means of a cap $r$ threaded on the open upper end of the bonnet $d$. The upper end of the valve stem $f$ extends above the cap $r$ and is provided with a hand-wheel $s$ by means of which the stem may be turned, thereby, through the screw-threaded connection between the stem $f$ and its extension $h$, seating or unseating the valve $k, k$.

The valve just described is one of the many different valve structures to which the anti-air-leakage elements of the invention are applicable, although a valve constructed as described, in connection with the anti-air-leakage elements of the invention, is of especial advantage in facilitating the application of such elements of the valve and in cooperating therewith to absolutely preclude air leakage.

In any valve unprovided with special anti-air-leakage contrivances, a certain amount of air will leak into the vacuum chamber around the valve and valve stem and probably between other mechanically united parts. In the valve structure described, air might leak between the valve stem and the cap $r$, gland $p$, packing $o$, bonnet $d$ and casing $a$. Air might also leak between the flange $c$ of the casing $a$ and the flange $e$ of the bonnet $d$. Air might also leak around the valve $k, k$, from the chamber under pressure to the chamber under vacuum. In certain uses of the described valve, or in other valve structures, there may be danger of leakage through a greater or fewer number of joints; but the solution of each leakage problem will be the same, in principle, as applied to different conditions. The following description illustrates different ways of applying the generic construction.

Within the packing $o$ is inserted a lantern ring $t$. This ring is provided with circumferential grooves $v, v$, in its inner and outer surfaces, which grooves communicate by means of perforations $u$. Aligning with ring $t$ is a hole in the bonnet $d$, with which communicates a pipe $w$. This pipe contains oil or other liquid, which flows into the cavities of the ring $t$. Air leaking into the valve structure around the valve stem cannot pass beyond the lantern ring, because it cannot pass downward through a liquid. What actually happens is that air exerts a pressure on the oil surface in the lantern ring and pushes oil down into the valve. Such seepage of oil into the valve is slight in amount, but, whatever may be the amount of oil that is thus forced into the valve, no harm is done, provided pipe $w$ is filled to the extent of maintaining some oil in its upstanding limb.

To prevent leakage between flanges $c$ and $e$, one of the flanges is provided with an annular rib $x$ which extends into a groove in the other flange. A soft gasket $y$, preferably of copper, is confined between the rib and groove. This metal gasket affords an air-tight seal.

To insure that this seal is functioning, the periphery of the flange $c$ is provided with an upstanding ridge $z$, which provides an annular reservoir or gutter between the ridge and the flange $e$. This gutter is filled with oil. Air pressure tends to force this oil between flanges $c$ and $e$ into the valve, but the joint formed by gasket $y$ prevents the passage of liquid as well as of air. If, however, this seal should be defective, oil will be forced past the same, and the level of oil in the gutter will drop, which will visually indicate that the gasket joint is defective. The gutter will then have to be maintained full of oil until opportunity arises to dismantle the bonnet of the valve structure and replace the gasket. In the meantime, however, no leakage of air into the valve will occur, notwithstanding the defective character of the joint which is intended to normally prevent such leakage.

While the described specific construction of the valve and valve seat will render the valve very nearly completely tight, air leakage is insured against by filling the spaces $m$ between the valve discs and the space $n$ with oil and providing a pipe 10, similar to pipe $w$, communicating with a hole 11 in the casing, hole 11 communicating with space $n$. Thereby a seal of oil is maintained between the discs $k, k$ of the valve and at the joints between the discs and the valve seat. If the passage on the left of the valve is assumed to be at atmospheric pressure and the passage on the right of the valve under a vacuum, air will try to force itself around the valve from the left hand passage to the right hand passage, but, owing to the liquid seal described, this passage of air is prevented, and the air pressure can be effective only to push oil beyond the valve. Any oil so pushed out from between the valve discs will be simultaneously replaced by oil from pipe 10.

When the valve is to be opened, a cap 12 is placed on the open upper end of pipe 10, thus preventing atmospheric pressure from forcing all the oil in the pipe immediately into the valve body, which would be followed by an inrush of air through the pipe. When the valve is shut, cap 12 is removed, thus restoring atmospheric pressure to the oil in pipe 10.

Having now fully described the invention, what I claim and desire to protect by Letters Patent is:

1. A valve structure comprising two opposed valve seats inclined relatively to each other, a valve comprising two halves each of which is adapted to engage one of said seats, a movable stem, and means for pivoting said halves upon said stem for independent movement about a common axis parallel to the planes of the seats, adjacent faces of said halves being provided with engaging rounded knobs whereby, when the valve halves are engaged with their respective seats, movement of the halves towards each other is limited by contact of the knobs.

2. A valve structure comprising opposed valve seats, valve sections engageable with said seats and spaced from each other to provide a sealing chamber therebetween, a pipe of relatively small diameter having vertical and horizontal portions, the latter portion communicating directly with said chamber, said pipe having a sufficient volume to contain enough liquid to substantially fill the sealing chamber, and means for closing said vertical portion whereby liquid may be maintained within said pipe when the valve is opened and permitted to flow from the pipe into the chamber when the valve is closed.

In testimony of which invention, I have hereunto set my hand, at Marcus Hook, Pennsylvania, on this 17th day of June, 1925.

ARTHUR E. PEW, Jr.